(No Model.) 2 Sheets—Sheet 1.
A. WICKEY & A. A. GEHRT.
HAY AND COTTON PRESS.
No. 263,372. Patented Aug. 29, 1882.
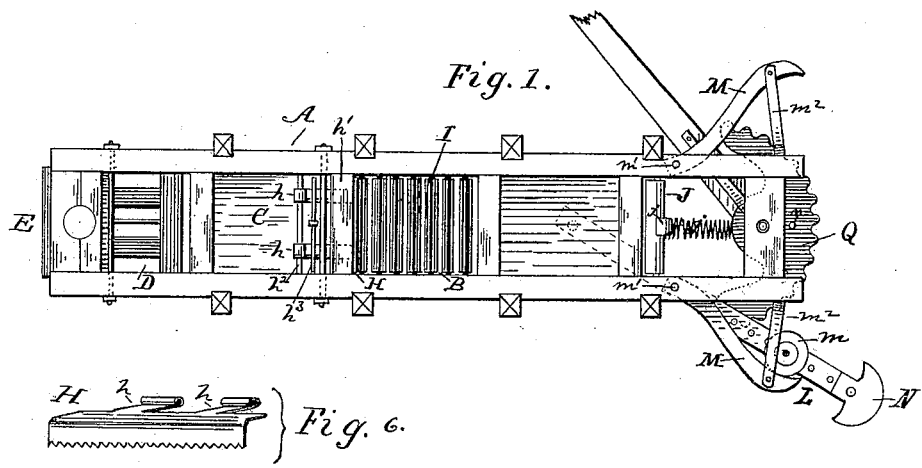
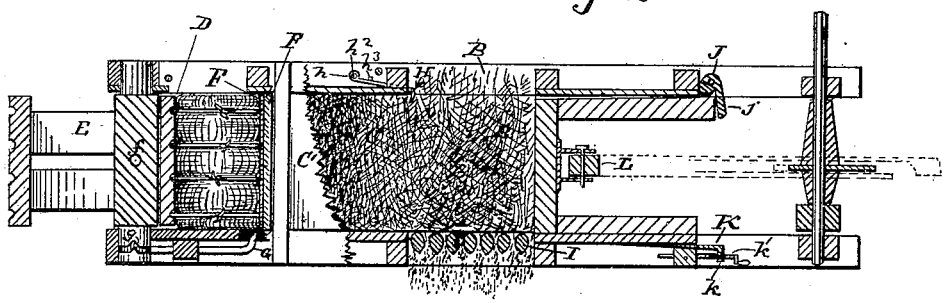
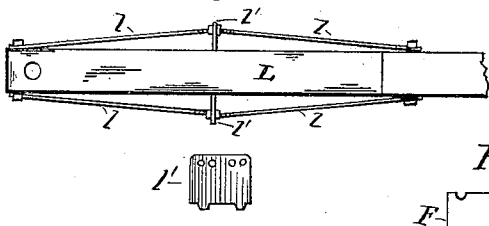
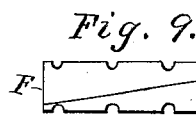
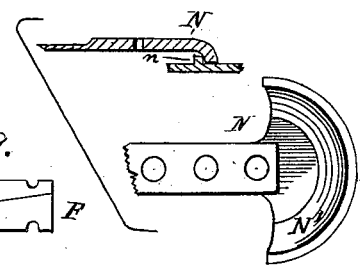
WITNESSES:
Thos. Houghton.
A. G. Lyne.
INVENTOR:
A. Wickey
A. A. Gehrt
BY
ATTORNEYS.

(No Model.) 2 Sheets—Sheet 2.
A. WICKEY & A. A. GEHRT.
HAY AND COTTON PRESS.
No. 263,372. Patented Aug. 29, 1882.
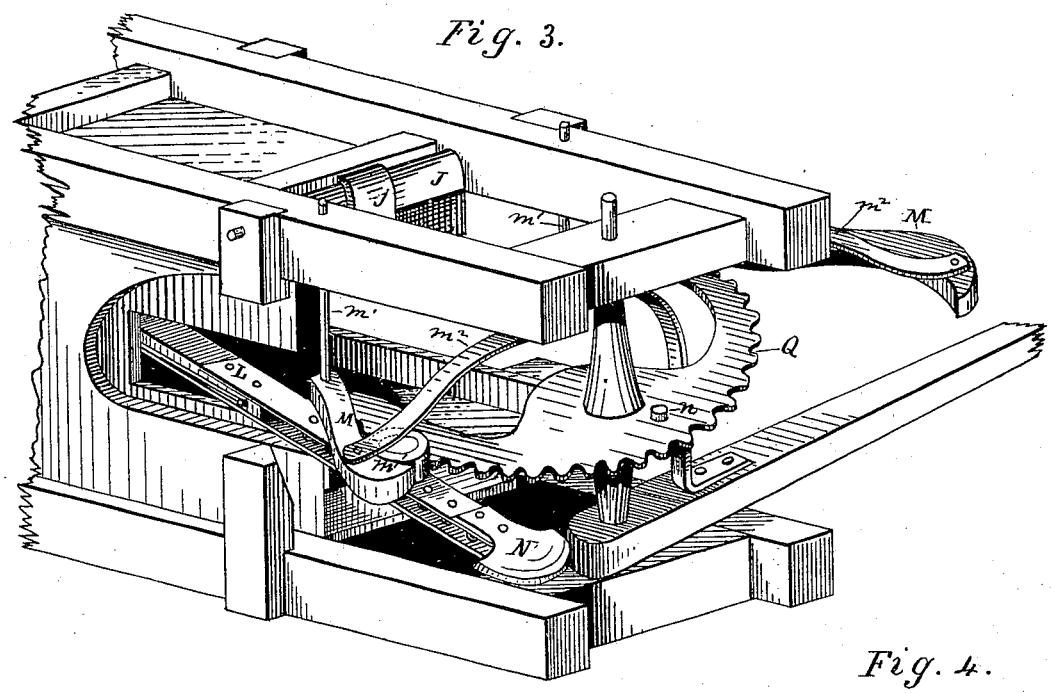
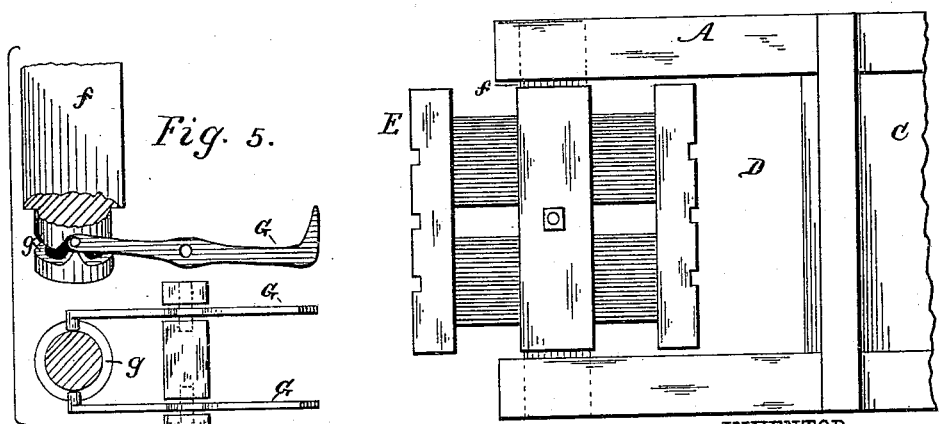

UNITED STATES PATENT OFFICE.

ANDREW WICKEY AND ALBERT A. GEHRT, OF QUINCY, ILLINOIS.

HAY AND COTTON PRESS.

SPECIFICATION forming part of Letters Patent No. 263,372, dated August 29, 1882.

Application filed October 13, 1881. (No model.)

*To all whom it may concern:*

Be it known that we, ANDREW WICKEY and ALBERT A. GEHRT, both of Quincy, in the county of Adams and State of Illinois, have invented a new and useful Improvement in Hay and Cotton Presses, of which the following is a full, clear, and exact description, reference being had to the annexed drawings, forming part of this specification.
Our present invention relates to an improvement in hay and cotton presses invented by us, and for which we were granted Letters Patent No. 247,974, dated October 4, 1881. In our former application we described a horizontal press having a follower adapted to be operated by means of a sweep, and an intermediate gearing consisting of a toothed segment and double rack-bar, and provided with a sliding head which was adapted to be revolved about a pivot for ejecting the completed bale.

In our present invention we have made certain new and useful improvements relating to different parts of the press, as will be hereinafter fully described.

In the accompanying drawings, Figure 1 is a plan view of our improved baling-press. Fig. 2 is a side elevation of the press, partially in section longitudinally, and showing the wall C' of the compressing-chamber partly broken away; Fig. 3, a perspective view of the forward end of the press; Fig. 4, an elevation of the rear end of the press; and Figs. 5, 6, 7, 8, and 9 are detail views.

The horizontal press A is constructed with a follower-chamber, B, a compressing-chamber, C, and a bale-chamber, D, the first having an opening at the top, through which the hay is to be fed, and the last being made with open sides, through which the bale is to be ejected.
The sliding head E, which is secured to a journaled post at the rear end of the bale-chamber, and which is constructed as in our former invention, is adapted to fill the bale-chamber, so that either one of its heads shall serve to close the rear end of the compressing-chamber C, as shown in Fig. 1. The sliding head, which is held to the journaled post by means of a bolt passing through clamping plates or bars, through which the head is adapted to slide under pressure, will gradually yield as the material is being compressed in the chamber C until its forward head reaches the rear end of
the bale-chamber D, and the said chamber is occupied by the bale. Before the bale is driven into the bale-chamber, however, a pair of wedge-shaped plates, F, having tying-recesses in their rectangular sides, are placed in the forward end of the compressing-chamber, with the thin end of one against the thick end of the other, so as to form a partition-wall of equal thickness throughout, and so as to be adapted to slide laterally from each other under pressure. When the said plates have been put in position additional material is fed into the follower-chamber, and the bale and sliding head are thus forced backward in the bale-chamber D by the repeated action of the follower and the gradual increase of new material. When the forward end of the sliding head reaches the journaled post the pair of wedges will have reached the end of the compressing-chamber C, and, as the bale-chamber is formed with open sides, the pressure exerted will cause one of the wedges to slide laterally from off the other, carrying the adjacent end of the bale, and at the same time causing the sliding head to turn with its journaled post. In this manner the press is made self-discharging and the use of side doors rendered unnecessary.

In our former invention we provided but one chamber for compressing the bale, and this we constructed with side doors, through which the completed bale could be discharged. Consequently each bale had to be formed by a separate and independent operation; but it will be seen that by adding an additional chamber and wedge-shaped partition a second bale may be partly formed while the first is being completed, and without additional labor. This opensided bale-chamber, therefore, constitutes one of the features of our improvement.

For holding the material of the second bale in the compressing-chamber while the first bale is being discharged, and until the rear end of the sliding head is turned into the bale-chamber to take up the space made vacant by the ejected bale, we provide two stops, G, which consist of two parallel bars pivoted underneath the bottom of the bale-chamber D, and having their forward ends curved upward through slots in the bottom of the bale-chamber at a point nearly on a line with the rear end of the compressing-chamber, and having their rear ends bent inward toward each other, as in Fig.

5, and adapted to fit in a cam-groove, *g*, in the lower end of the journaled post *f*, so that the two stops or bars will be rocked when the post is revolved with the sliding head, and their forward ends made to rise or fall through the said slots. The cam-groove is so constructed that the stops will rise within the bale-chamber as soon as the sliding head begins to turn in discharging the completed bale, and will remain in this position until half a revolution of the sliding head is made and the opposite end thereof is brought into position to support the material in the compressing-chamber. The stops will then fall through the slots and allow the said material to expand and come in contact with the sliding head, whereupon the wedge-plates are again to be inserted into the forward end of the compressing-chamber, and the process of forming a third bale begun while the second is being completed and discharged from the press.

For holding the material in the compressing-chamber C when the follower is withdrawn at each oscillation of the sweep, we provide a serrated plate, H, which is provided with two rectangular arms, *h*, passing through recesses in the cross-piece *h'*, and pivoted above the lining of the chamber by means of a rod, $h^2$, so that its serrated edge shall overlap the forward end of said lining and project downward between the compressing and the follower chambers. A spring-bar, $h^3$, is secured across said arms on the upper surface of the said top lining, so that the serrated edge of the plate H shall be normally held below the inner surface of the top lining, and shall serve to hold the material within the chamber as each forkful is pressed beyond the said plate. The serrations are inclined inward, so as to give them a better hold upon the material, and to prevent friction with the upper surface of the follower, which is beveled on its upper surface at its contact end. It will be seen that this plate H serves as a comber of the material, the inclined serrations allowing the material to pass under them into the compressing-chamber, thus causing the top of the bale to be made smooth, while they prevent the material from expanding back into the follower-chamber when the follower is withdrawn.

Instead of cylindrical friction-rollers in the bottom of the follower-chamber, as provided in our former invention, we have adopted the use of oscillating slats having egg-shaped circumferences. These slats I are so arranged in the bottom of the follower-chamber that when not in contact with the follower they shall hang with their longest transverse diameters in a vertical position, leaving intervals between them through which the seeds of the hay, &c., shall fall as the latter is being fed into the press, and shall be adapted to oscillate in the same direction when the follower passes over them, so as to close the intervals and form a comparatively-smooth bottom, over which the hay will readily pass when forced by the follower.

In connection with the follower, also, we have provided a stop or brake, J, which consists of an eccentric roller pivoted at the top of the machine so that one of its faces shall be even with the inner surface of the top lining at the forward end of the follower-chamber, and provided with an arm or lever, *j*, near the center. As the follower is drawn back by the tension of the spring which holds it, it comes in contact with the arm *j*, and as the arm is thrust up it turns the roller to which it is attached until the eccentric part of the roller is turned down in contact with the upper surface of the follower, thus forming a brake which quickly brings the follower to a stop.

In addition to the stop J we also provide a wedge, K, which is adapted to be inserted between the bottom lining of the forward part of the follower-chamber and a cross-piece of the frame-work. The thicker part of this wedge is secured to a nut, *k*, through which a crank-screw, *k'*, passes and enters the said cross-piece, so that by turning the crank the wedge may be set so as to lift the bottom lining, and thus check the backward movement of the follower.

The follower-pitman L in our present invention is provided with truss-braces *l*, which consist of rods secured at the ends of the pitman by means of bolts passing through the pitman and secured to loose bridges at the center of the pitman. Two of these rods are used on each side of the pitman and have their ends, which meet at the center, inserted through the bridge *l'* and held by nuts. The bridges *l'* are provided with studs at the base, which rest in recesses in the pitman to hold them in position, at the same time allowing them to accommodate themselves to the tension of the truss-rods. By the use of two trusses on opposite sides of the pitman the latter is stayed both longitudinally and transversely. We reserve the right of making the improved pitman the subject-matter of a subsequent application.

As an addition to our former invention, we arrange guides or fenders M on opposite sides of the press-frame, which are curved reversely at their ends to form a track for a friction-roller, *m*, on the upper surface of the follower-pitman. As the segmental gear Q is operated to right or left by means of the sweep, which is arranged near the bottom of the machine and provided with a curved arm for engaging with the ends of the segment, the pitman is projected beyond the segment at either side thereof, and the rack-bar of the pitman is held in gear with the segment at either extreme end of the latter by means of these fenders, which limit the lateral movement of the pitman. The said fenders are secured to the top of the machine by means of rods *m'* and curved supports $m^2$, attached to opposite ends of the fenders, so as to support them in the same plane with the friction-roller.

As a further means of providing a secure connection between the segment and rack-bar of the pitman, we provide the end of the pitman with a semicircular head, N, having its under surface, which projects beyond the end of the pitman, constructed with a semicircular groove, N', which is adapted to receive a lug, n, on the upper surface of the segment. As the segment is oscillated, bringing the head N to its center, at which point the lug n is located, the lug will enter the groove on one side of the head and pass out at the other as the pitman passes to the opposite side of the segment. By this means the pitman is held in engagement with the segment until the friction-roller is thrown in contact with one of the fenders, and then the fender serves to preserve the engagement until the head is again brought into engagement with the lug on the segment.

Having thus described our invention, what we claim as new, and desire to secure by Letters Patent, is—

1. In a baling-press, the combination, with chambers C and D and the sliding head E, of a pair of wedge-shaped plates, F, adapted to form together a partition-wall between a complete and an incomplete bale, and to assist in discharging the completed bale by sliding laterally from each other through the sides of the open bale-chamber, substantially as shown and described.

2. In a baling-press, the combination of a compressing-chamber in which the bale is begun and a bale-chamber in which the bale is completed, the latter being formed with open sides, a removable partition between said chambers, and a sliding and revolving head forming one end of the bale-chamber, substantially as shown and described, whereby two bales shall be in process of formation at the same time, and the completed bale shall be automatically discharged from the press, as set forth.

3. In a baling-press, the combination, with bale-chamber D, having slots in the bottom, sliding head E, and the journaled post f, having cam-groove g in its lower end, of the stops G, pivoted underneath the bottom of said chamber and oscillated by the rotation of the sliding head E, whereby their forward ends shall be moved into or out of the slots, substantially as and for the purpose specified.

4. In a baling-press, the combination, with the follower and follower-chamber, of a bottom formed of oscillating slats having egg-shaped circumferences and arranged at intervals apart to allow the seeds to drop through, and adapted to be oscillated by the follower to form a close bottom, while the follower and hay are passing over them, substantially as shown, and for the purpose specified.

5. In a baling-press, the combination, with the follower and follower-chamber, of a stop or brake mechanism, substantially as shown and described.

6. In a baling-press, the combination, with the follower and follower-chamber, of the stop or brake J, secured to the upper part of said chamber, and the wedge K, adapted to be inserted between the bottom lining of said chamber and a cross-piece on the outer side thereof by means of the crank-screw $k'$, by which the wedge is supported, substantially as shown and described.

7. In a baling-press, the combination, with the pitman L, having a friction-roller, m, secured to its upper surface, of the fenders M, secured to opposite sides of the forward end of the press and adapted to form tracks for the said roller, substantially as shown and described, and for the purpose set forth.

8. In a baling-press, the combination, with the segmental gear having a lug, n, on its upper surface, of the head N, secured to the end of the pitman, and having a semicircular groove in its under surface for receiving the lug, substantially as specified.

ANDREW WICKEY.
ALBERT A. GEHRT.

Witnesses:
JOHN A. ALLEN,
A. A. RICHARDSON.